Feb. 6, 1962 P. CHEILIK 3,020,417
TRANSISTOR MULTIVIBRATOR
Filed March 11, 1957
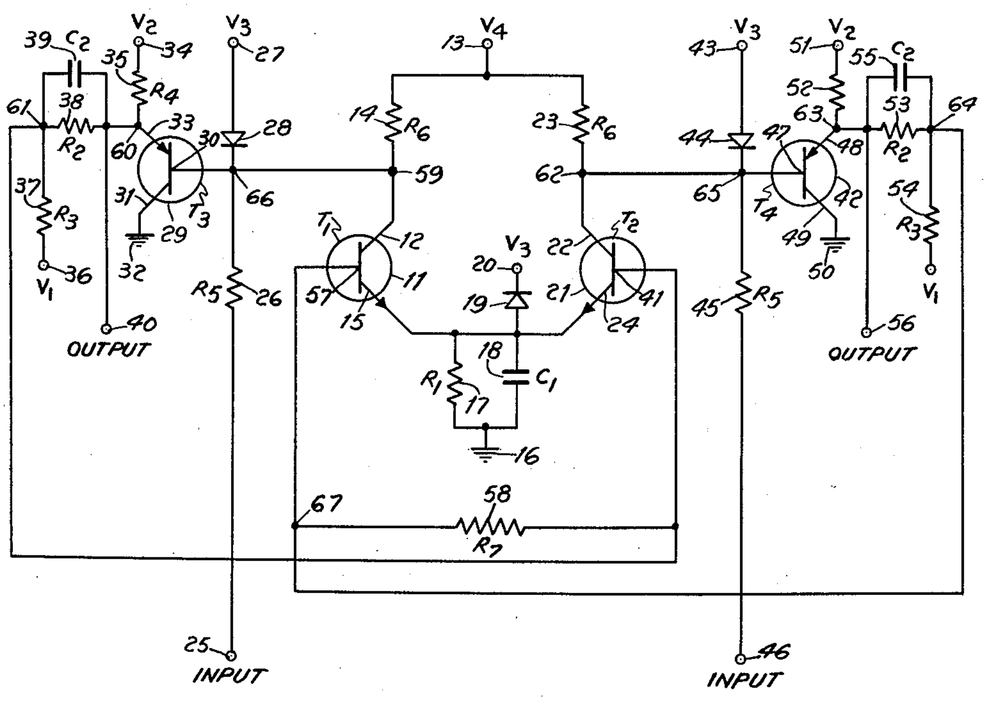
Inventor
PHILIP CHEILIK
By Philip M. Bolton
Attorney

United States Patent Office 3,020,417
Patented Feb. 6, 1962

3,020,417

TRANSISTOR MULTIVIBRATOR

Philip Cheilik, Bronx, N.Y., assignor to International Telephone and Telegraph Corporation, Nutley, N.J., a corporation of Maryland Filed Mar. 11, 1957, Ser. No. 645,358
7 Claims. (Cl. 307—88.5)

This invention relates in general to multivibrator circuits and more particular to transistor multivibrator circuits.

Transistor multivibrator circuits, especially of the bistable variety, have become very important building blocks in computer and automatic control circuitry, wherein they are rapidly replacing the analogous tube circuits. In the transistor circuit design thus far, however, the substitution of this basic building block into various voltage supply conditions has been accompanied by a change of circuit parameters to insure proper operation. Likewise, if there has been a substitution in the multivibrator circuit of the transistor components with different ratings, this too has been accompanied by a change of design in circuit parameters.

It is obvious that having developed a basic building block with all its inherent desirable qualities of good reliability, minimum breakdown, etc., such as are inherent to the transistor multivibrator circuit, that it would be highly desirable to add to the art, a transistor multivibrator circuit which would not be critical in the event there was a change in the voltage supply or a change in transistor components and would in addition have a high degree of trigger sensitivity notwithstanding either of the aforementioned changes.

It is therefore an object of this invention to provide an improved transistor multivibrator circuit.

It is a further object of this invention to provide a transistor multivibrator circuit which has a high degree of trigger sensitivity and which can tolerate changes in voltage supply or in transistor components without a sacrifice of this high degree of trigger sensitivity.

In accordance with the above objects, the invention features a negative feedback circuit. The negative feedback circuit is arranged by having an impedance connected between the base elements of the principal transistors. In accordance with this circuitry the electron flow supplied to the cross-coupling network of the conducting side of the multivibrator is partially supplied through the negative feedback impedance by the cross-coupling network of the non-conducting transistor. By supplying part of the current from the cross-coupling network of the non-conducting transistor, the potential at the base of the conducting transistor is kept at a value which is only slightly higher than the potential value at the base of the non-conducting side, the latter potential obviously being at the cutoff. Trigger sensitivity being the measure of the base element potential between the value at conduction and the value at cutoff, it follows that with the base of the conducting side of the multivibrator circuit being kept at a potential close to the cutoff value and the base of the non-conducting side being kept close to the conducting value, there is a high degree of trigger sensitivity.

The above-mentioned and other features and objects of this invention will become more apparent by reference to the following description taken in conjunction with the drawing, which is a circuit diagram of a bistable multivibrator or "flip flop" circuit with the negative feedback circuit added.

In the figure there is a principal transistor $T_1$ (11) which has a collector element 12 connected to voltage source 13 through load resistor 14. $T_1$ (11) also has an emitter element 15 connected to ground 16 through resistor 17 and capacitor 18. The common point of the emitter bias circuit is clamped through the diode 19 to voltage supply 20. In a like manner the second principal transistor $T_2$ (21) has a collector element 22 connected to the voltage supply 13 through the load resistance 23. The emitter element 24 of $T_2$ is connected to ground 16 through the parallel circuit of resistor 17 and capacitor 18. The collector side of the load resistor 14 is connected in parallel to the input terminal 25 through the input resistor 26; to the clamping voltage 27 through the diode 28; and to the base of the coupling transistor 29 at point 30. The coupling transistor 29 has its collector element 31 connected to ground 32, while its emitter element 33 is connected to the voltage supply 34 through an emitter follower 35. The emitter side of the follower resistor 35 is connected to voltage supply 36 through two series connected resistors 37 and 38, the latter resistor being shunted by the capacitor 39. The emitter side of the resistor 38 is connected to the output terminal 40. The common point between the two resistors 37 and 38 is connected to the base element of the principal transistor $T_2$ at point 41. In a completely symmetrical arrangement the other half of the multivibrator circuit has a coupling transistor 42, a clamping voltage supply 43 coupled through a diode 44, an input resistor 45, an input terminal 46, a base element of the coupling transistor 47, an emitter element 48, a collector element 49 connected to ground 50, a voltage supply 51 connected to an emitter follower resistance 52, a pair of series resistances 53 and 54, a shunt capacitor 55, an output terminal 56, with the coupling network connected to the base of the principal transistor $T_1$ at point 57. Connected between the circuitry leading from the base points 41 and 57 there is a resistor 58. A clearer understanding of the operation of the multivibrator circuit will become apparent in accordance with the following discussion.

Let us assume that $T_1$ (11) is conducting and $T_2$ (21) is non-conducting. Let us further assume that there is a negative pulse applied to the input terminal 46. When $T_1$ is conducting there is a voltage at point 59 which is less than voltage 13 but not less than voltage 27. Let the voltage at point 59 be called $V_a$. The voltage $V_a$ will appear at the emitter side of the emitter follower at point 60 assuming a negligible drop across the transistor elements. $V_a$, then appearing at point 60, will represent the upper voltage value of the voltage divider circuit between point 36 and point 60. This voltage divider circuit will set up a voltage value at point 61 which is less than $V_a$ and by proper choice of parameters, will be a voltage value which is sufficient for cutoff. Let the voltage value at point 61 be called $V_b$. $V_b$ will then appear at point 41 to hold $T_2$ in a cutoff condition. With $T_2$ non-conducting, a voltage value will appear at point 62 which will be equal to the voltage 13. From an analysis similar to that given for determining the voltage $V_b$ at point 41, it is clear that voltage 13 will appear at point 63 and a voltage at point 64 will be of sufficient magnitude to cause $T_1$ to conduct since the voltage at 64 appears at point 57. Let the voltage at point 64 be called $V_c$. Our discussion thus far has defined a voltage $V_b$ as a cutoff bias and $V_c$ as a conducting bias. Returning now to the negative pulse that was applied to the input terminal at 46. This negative pulse will appear at point 65 and will cause the voltage at points 62 and 63 to go to $V_a$. It follows from the foregoing discussion when point 63 has the value of $V_a$ then point 64 will have the value of $V_b$ and $T_1$ will be cutoff. Following a normal flip-flop operation, when $T_1$ cuts off, point 59 rises to voltage 13 as does point 60 which causes to appear at point 61 a voltage equal to $V_c$ thus biasing point 41 such that $T_2$ now conducts. The foregoing has been a description of the operation of the flip flop of FIG. 1 without considering the addition of $R_7$ (58) and the role it plays in the circuit.

Let us assume once again that $T_1$ is conducting and $T_2$ is non-conducting. The value of $V_c$ as found at point 57 is determined by the parameters in the cross-coupling circuit to wit: $R_2$, $R_3$, and $R_4$ and the voltage supplies $V_1$, $V_2$, $V_3$ and $V_4$. For a particular operation a proper choice of these parameters may cause the circuit to function satisfactorily without the addition of $R_7$. If, however, $T_1$ and $T_2$ are replaced with transistors of different ratings or if there is unbalance between $T_1$ and $T_2$, the voltage value appearing at point 64 may be such that in conjunction with an input pulse appearing at point 65 there will be no triggering action. In other words, if the transistors, or a particular one of the transistors, for instance $T_1$, had a $\beta$ value larger than the transistor of the original design or if there were a change in the voltage supply causing the value of the potential at point 64 to be made large, the result would be an increase in the emitter electron flow. An increase in the emitter electron flow would raise the voltage value across resistor 17 to a value approaching or being at the clamp voltage value 20. It follows there would also be an increase in the collector electron flow with a resulting minimum value of potential, limited by a clamp at 27, of point 59. With the voltage drop across 17 being a maximum and the potential at 59 and hence at 61 being a minimum, the voltage shift necessary to lift point 41 to a conducting bias might very well be greater than the shift created by the left hand coupling network when $T_1$ is cutoff. The addition of the feedback circuit alters the condition by allowing electron flow from the left hand cross-coupling network through resistor 58 to the right hand coupling network. The increased electron flow through resistor 58 will cause the potential at 64 to approach the value of the potential at 61 limited by the potential drop across resistor 58. It follows that as point 64 acquires a lower potential value, the emitter and collector currents of $T_1$ are reduced causing the drop across resistor 17 to lower and causing the potential at point 59 to rise, thus making the difference in the potential value between 41 and the emitter resistor potential a smaller difference. The operation continues until point 41 and point 57 are held substantially close to the same potential value. It becomes clear that the addition of this negative feedback circuit provides that the base of the non-conducting side is held at a potential only slightly lower than the conducting bias and that the base of the conducting side is held at a potential only slightly higher than the cutoff bias regardless of the inter-change within limitations of transistor components or changes in voltage supply, thus insuring a good trigger sensitivity.

Since the circuit is symmetrical, an analysis similar to that given above will show that when $T_2$ conducts and $T_1$ is non-conducting, point 41 will be held at a potential value slightly higher than point 57 as a result of the electron flow from the right hand cross-coupling network through resistor 58 to point 61.

In the preferred embodiment as shown in the drawing, the principal transistors are of the junction N-P-N variety while the coupling transistors are of the junction P-N-P variety. There could be an inter-change of types for either of these transistors, that is to say, with a slight circuit modification the coupling transistor could be a junction N-P-N type while the principal transistor could be a junction P-N-P type. There could be a further substitution by way of species of transistors in that with a further circuit modification transistors of the point contact variety could be used.

While I have described above the principles of my invention in connection with specific apparatus, it is to be clearly understood that this description is made only by way of example and not as a limitation to the scope of my invention as set forth in the objects thereof and in the accompanying claims.

I claim:

1. A self-biasing multivibrator circuit comprising first and second principal transistors, one of said principal transistors conducting while simultaneously the other principal transistor is not conducting to provide multivibrator action, each of said transistors having an input electrode, an output electrode and an emitter electrode, first and second voltage divider circuits each coupled to a source of potential, circuitry means respectively coupling each of said output electrodes to an associated one of said voltage divider circuits, first circuitry means coupling the input electrode of said first transistor to said second voltage divider circuit, second circuitry means coupling the input electrode of said second transistor to said first voltage divider circuit and a feedback circuit for maintaining the potential at the input electrode of the conducting transistor at a value closely approximating the cut-off potential of said conducting transistor and below saturation, including a resistor coupled directly between said first and second input electrodes.

2. A multivibrator circuit comprising first and second principal transistors, one of said principal transistors conducting while simultaneously the other principal transistor is not conducting to provide multivibrator action, each of said transistors having an input electrode, an output electrode and a emitter electrode, first and second voltage divider circuits each coupled to a source of potential, circuitry means respectively coupling each of said output electrodes to an associated one of said voltage divider circuits, each of said emitter electrodes coupled to a reference potential, first circuitry means coupling the input electrode of said first transistor to said second voltage divider circuit, second circuitry means coupling the input electrode of said second transistor to said first voltage divider circuit, and a feedback circuit for maintaining the potential at the input electrode of the conducting transsistor at a value closely approximating the cut-off potential of said conducting transistor and below saturation including a resistor coupled directly between said first and second input electrodes.

3. A multivibrator circuit according to claim 2, wherein each of said voltage divider circuits includes a coupling transistor having an input electrode, an output electrode and a collector electrode, each of said coupling transistor output electrodes coupled to a pair of series impedance means, the common point between each of said pair of impedance means respectively representing the coupling point of an associated one of said principal transistor input electrodes.

4. A self-biasing multivibrator circuit comprising first and second principal transistors, one of said principal transistors conducting while simultaneously the other principal transistor is not conducting to provide multivibrator action, each of said transistors having an input electrode, an output electrode and a emitter electrode, first and second voltage divider circuits each coupled to a source of potential, circuitry means respectively coupling each of said output electrodes to an associated one of said voltage divider circuits, first circuitry means coupling the input electrode of said first transistor to said second voltage divider circuit, second circuitry means coupling the input electrode of said second transistor to said first divider circuit, and a feedback circuit including a resistor directly coupled between said first and said second input electrodes to effect a negative feedback condition whereby the potential at the input electrode of the conducting transistor is held at a value determined by the potential value of the input electrode of the non-conducting transistor and below saturation.

5. A multivibrator circuit comprising a first and second principal transistor, one of said principal transistors conducting while simultaneously the other principal transistor is not conducting to provide multivibrator action, each of said transistors having a collector, emitter and base elements, first and second voltage divider circuits each coupled to a source of potential circuitry means respectively coupling each of said collector elements to an associated one of said voltage divider circuits, a common emitter impedance coupling between each of said emitter elements and a point of reference potential, first circuitry means coupling the base element of said first transistor to said second voltage divider circuit, second circuitry means coupling the base element of said second transistor to said first divider circuit, and a feedback circuit directly coupled between said first and said second base elements to effect a negative feedback condition whereby the potential at the base element of the conducting transistor is held below saturation at a value close to and determined by the potential value at the base element of the non-conducting transistor.

6. A multivibrator circuit according to claim 5, wherein there is further included a pair of impedance means each respectively coupled between an associated one of said collector elements and a common reference voltage means.

7. A multivibrator circuit comprising first and second principal transistors, one of said principal transistors conducting while simultaneously the other principal transistor is not conducting to provide multivibrator action, each of said principal transistors having a collector, emitter and base elements, a first and second impedance element coupled between an associated one of said collector elements and a referenced potential point, a common emitter impedance coupled between each of said emitter elements and a point of reference potential, first unidirectional element coupling the common point of said emitters to a reference voltage point, a first and second coupling transistor each having collector, emitter and base elements, first circuitry means coupling the base of said first coupling transistor to the collector of said first principal transistor, second circuitry means coupling the base of said second coupling transistor to the collector of said second principal transistor, a second and third unidirectional current flowing devices each respectively coupled to one of said first and second circuitry means, a first and second pair of series connecting impedance elements each coupled to an associated emitter of an associated coupling transistor, first means coupling the common point of said first pair of series connected impedances to the base element of said second principal transistor, second means coupling the common point of said second series connected impedances to the base element of said principal transistor, and a feedback circuit including a resistor directly coupled between said first and second connecting means whereby the potential at the base of the conducting principal transistor is held at a value determined by the potential value at the base of the non-conducting transistor and below saturation.

References Cited in the file of this patent

UNITED STATES PATENTS

| | | |
|---|---|---|
| 2,270,449 | Kahn | Jan. 20, 1942 |
| 2,440,992 | Webb | May 4, 1942 |
| 2,470,028 | Gordon | May 10, 1949 |
| 2,506,439 | Bergfors | May 2, 1950 |
| 2,569,345 | Shea | Sept. 25, 1951 |
| 2,900,606 | Faulkner | Aug. 18, 1959 |

OTHER REFERENCES

Prom et al.: Publication, "Junction Transistor Switching Circuit for High Speed Digital Computer Applications," March 1956, published by Sylvania Elec. Products Corp., Electronic System Div., Waltham Labs., Waltham, Mass.